Figure 5:
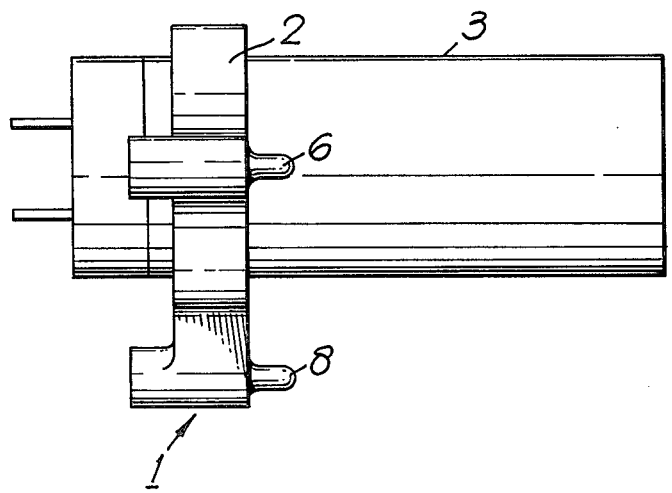

United States Patent [19]

Churchill

[11] Patent Number: 4,470,105
[45] Date of Patent: Sep. 4, 1984

[54] OPTICAL APPARATUS

[75] Inventor: John E. Churchill, Cambridge, England

[73] Assignee: U.S. Philips Corporation, New York, N.Y.

[21] Appl. No.: 453,424

[22] Filed: Dec. 27, 1982

[30] Foreign Application Priority Data

Jan. 18, 1982 [GB] United Kingdom ............. 8201254

[51] Int. Cl.³ .............................................. F21V 21/00
[52] U.S. Cl. .................................. 362/396; 362/217;
362/220; 362/250; 362/269; 362/272; 362/275;
362/285; 362/286; 362/287; 362/418; 362/419;
362/428
[58] Field of Search ............... 362/217, 220, 250, 269,
362/272, 275, 285, 286, 287, 396, 418, 419, 428

[56] References Cited
U.S. PATENT DOCUMENTS 4,390,929  6/1983  La Fiandra .................... 362/285 X Primary Examiner—Stephen J. Lechert, Jr.
Attorney, Agent, or Firm—Paul R. Miller

[57] ABSTRACT

A kinematic lamp mount for mounting a spectral source lamp (3) such as a hollow cathode lamp accurately with respect to an optical axis of, for example an atomic absorption spectrophotometer comprises a base member (100), a lamp holder (1) and two spring means (120, 121) which urge the holder (1) into contact with the base member (100). The holder (1) is provided with three ball ended feet (6,8,10) two of which (6,8) are adjustable. Two feet (6 and 10) engage in an arcuate V-groove (102) while the third engages in a radial V-groove (103) giving kinematic connection between the holder (1) and base member (100).

By providing kinematic connection between the holder (1) and base member (100) the lamp holder (1) and hence the lamp (3) may be removed from and later replaced sufficiently accurately on the base member (100) that no re-adjustment is necessary. A collection of lamps and adjusted holders may be kept and used consecutively without requiring intermediate adjustment once all the collection have been initially adjusted thus speeding multi-element analysis.

18 Claims, 13 Drawing Figures

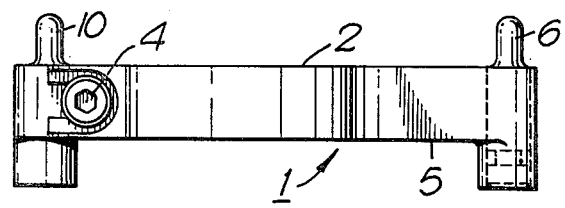
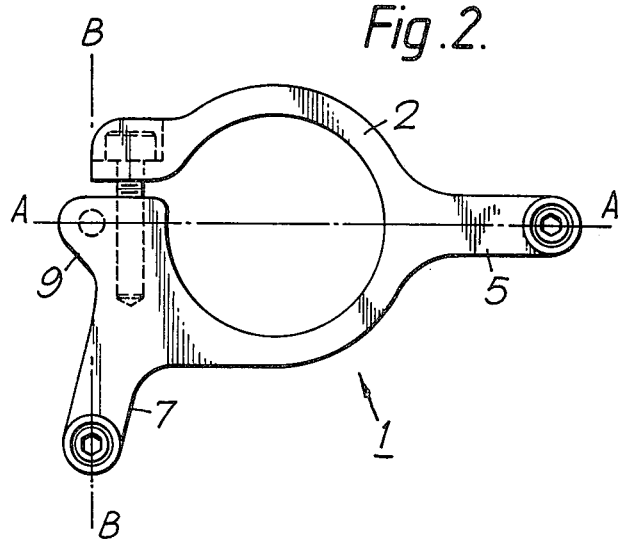
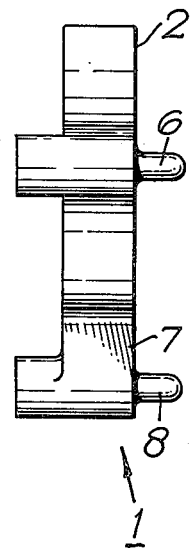
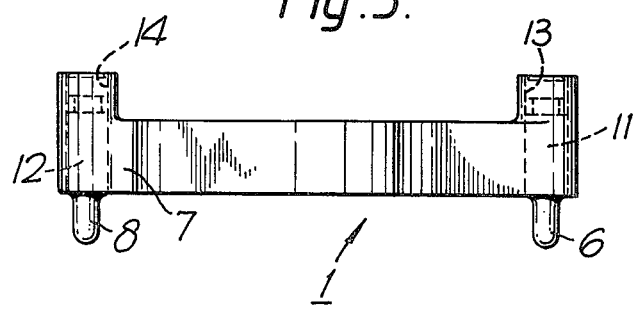

OPTICAL APPARATUS

The invention relates to an optical apparatus comprising a base member, an optical source lamp, a lamp holder, and means for urging the holder against the base member.

Many optical instruments require the use of a source lamp for producing radiation in a selected wavelength range. An example of such an instrument is an absorption photometer. A typical source lamp such as a hollow cathode lamp or an electrodeless discharge lamp, comprises a substantially cylindrical glass or quartz envelope. The actual radiation source within the lamp is very small, a few millimeter in diameter. When the lamp is installed within the instrument, the source must be exactly aligned with the optical axis of the instrument to provice maximum energy transfer. This adjustment may be made, although not without difficulty, when the instrument is assembled by the manufacturer. However, it is often necessary to change source lamps in the field either because of failure or deterioration of the original lamp, or to substitute a lamp having a different wavelength emission range. This is when problems often arise due to the fact that the glass or quartz envelopes vary from lamp to lamp, resulting in corresponding variations in mechanical positioning and in the optical characteristics acting upon the source. Previous source lamp positioning means have been adjustable to compensate for these variations, but the adjustments are quite tedious and time-consuming and require the making of a number of separate but interrelated adjustments.

An optical apparatus is disclosed in U.K. patent application No. 2,043,227A which comprises a base member, a substantially cylindrical radiation source lamp having a laterally projecting cylindrical protrusion, and a holder for adjustably positioning the lamp to direct radiation along a pre-selected optical axis and also includes a pair of pivot members between the base member and holder defining an axis of rotation substantially perpendicular to the optical axis and received by a linear groove parallel to the axis of rotation, a resilient bias for urging the holder to turn about the axis of rotation against the effect of an adjustable restraint and means for adjustably translating the holder along the axis of rotation as a result of linear movement between the groove and the pivot members.

The holder comprises a cradle block for supporting one side of the source lamp therein, a clamp member spaced from the cradle block and positionable on the opposite side of the source lamp and means for resiliently engaging the clamp member and the cradle block to secure the source lamp therebetween.

It is an object of the invention to provide an optical apparatus as described in the opening paragraph in which the source lamp may be removed from and replaced on the base member without requiring positional adjustment on each occasion.

The invention provides an optical apparatus as described in the opening paragraph characterised in that the holder has a three point kinematic contact with the base member and is provided with means for adjusting the position of the lamp with respect to the base member to direct radiation along a preselected optical axis.

By providing the adjusting means on the lamp holder and arranging kinematic contact between the holder and base member it is possible to assemble a collection of source lamps in separate holders which are each adjusted to align the lamp with the optical axis and then to quickly replace one lamp and holder by a further pre-aligned lamp and holder without any further adjustment.

In an optical apparatus which is relatively easy to manufacture the holders has three ball ended feet which engage in V-shaped grooves in the base member.

The holder may comprise a collar which is arranged to be clamped round the envelope of the lamp. The collar may be formed with three projections which extend perpendicular to the optical axis, the three contact points on the holder being formed on the projections. The means for adjusting the position of the lamp may comprise means for extending or retracting at least two of the feet in a direction parallel to the optical axis. At least two of the feet may have screw threaded portions which co-operate with screw threads in the apertures in the projections.

A holder having some or all of the features enumerated in the preceding paragraph may be conveniently manufactured from a plastics material by injection moulding.

The means for urging the holder against the base member may comprise two spring loaded L-shaped members which engage over two of the projections on the collar. Each spring loaded member maybe formed by a rod surrounded by a helical spring, the spring being assembled on the rod and base member so that the rod is caused to be rotated when the spring is compressed.

This provides a simple convenient means for restraining movement of the holder perpendicular to the base member. The automatic rotation of the rod when the spring is compressed simplifies the task of the operator when assembling the apparatus.

The base member may comprise a turntable having a plurality of locations at which a corresponding number of lamp holders may be positioned and means for rotating the turntable so that a desired location may be brought into register with the optical axis.

This enables the construction of a lamp turret in which a number of lamps maybe assembled and powered so that no 'warm up' time is required between measurements when the turret is indexed to bring the next lamp into position.

The turntable maybe provided with a circular V-shaped groove which is co-axial with the rotational axis of the turntable and a plurality of radial V-shaped grooves corresponding to the plurality of locations and in which each lamp holder has three ball ended feet two of which engage with the circular groove and the other of which engages with the appropriate radial groove.

This enables an accurately formed base member to be produced using comparatively simple manufacturing techniques. Sufficient accuracy can be achieved to enable lamp holders to be adjusted at one location on the turntable and replaced at another location without requiring re-adjustment.

The radial grooves may extend to the periphery of the turntable, the means for rotating the turntable then including a spring loaded roller which is biassed into the appropriate radial groove to bring the desired location into register with the optical axis. This arrangement can be used to ensure that the turntable is accurately positioned at each rotational step. The spring loaded roller mechanism may operate a switch when the roller enters the groove. The turntable maybe driven by means of a belt and pulley arrangement, the belt engaging with the periphery of the turntable, wherein a lost motion arrangement is incorporated between a drive motor and the pulley. When the switch is operated the direction of the motor maybe reversed for a predetermined period. The lost motion arrangement may comprise a peg which engages with the flat of a D shaped member, one of the peg and D shaped member being coupled to the motor and the other to the pulley.

The features described in the preceding paragraph enables the turntable to be accurately indexed with no force biassing the turntable in either rotational direction.

Figure 6:
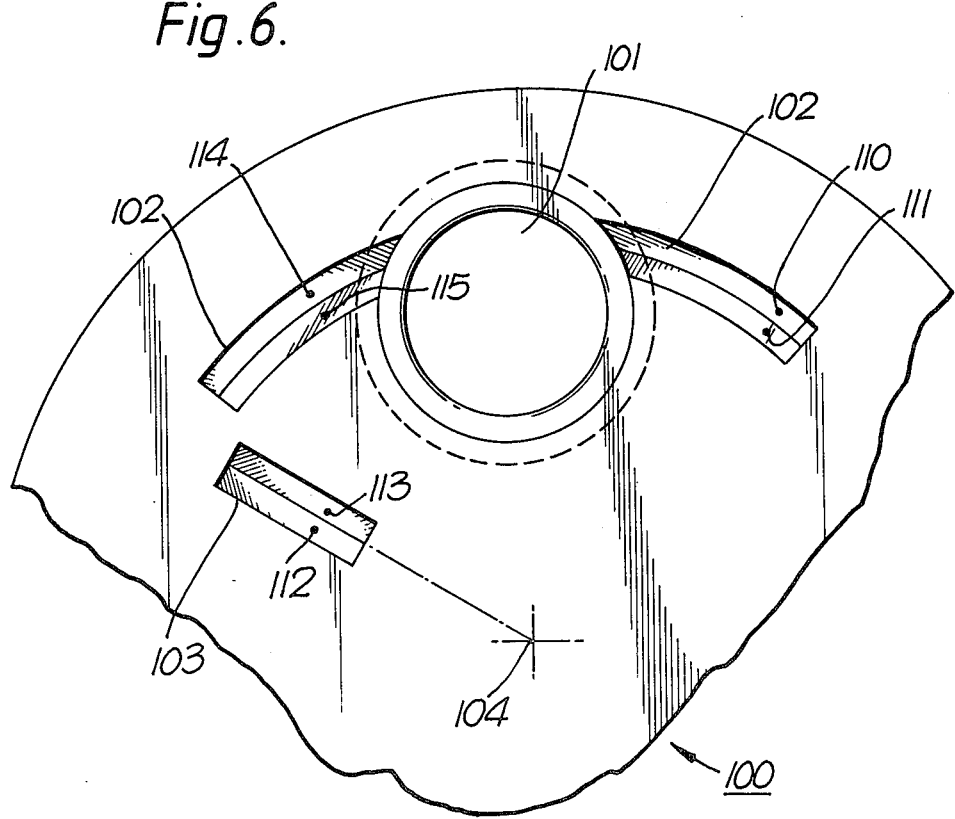
Figure 7:
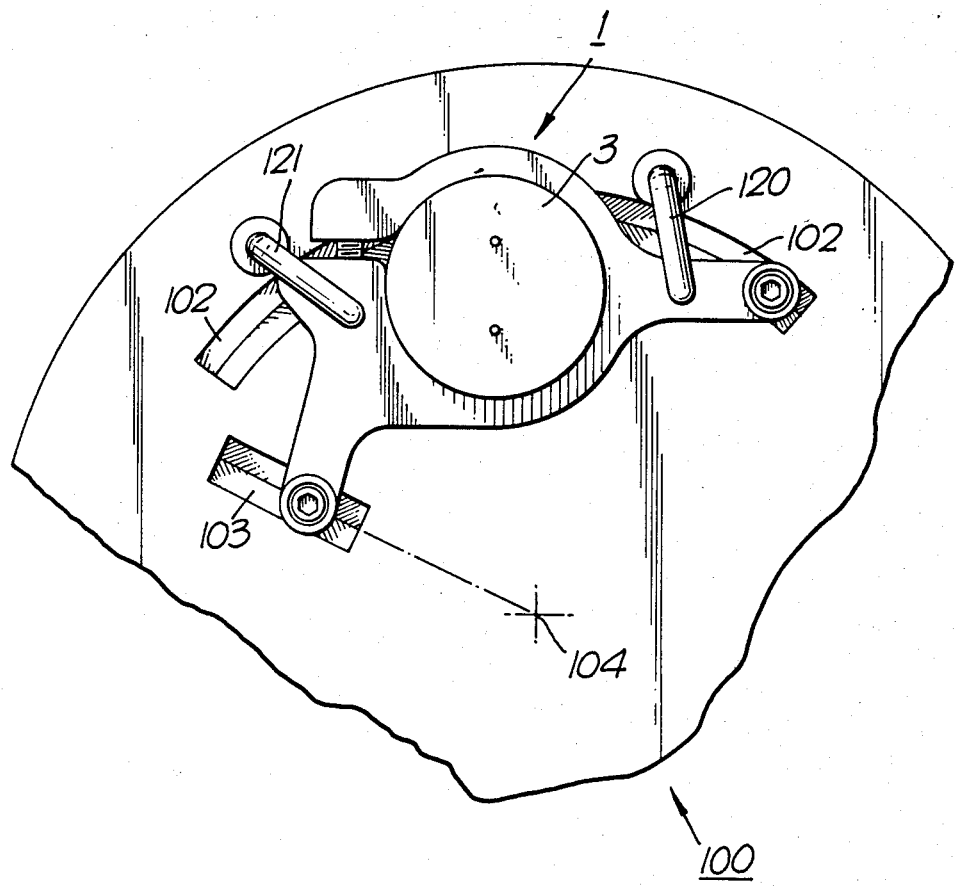
Figure 8:
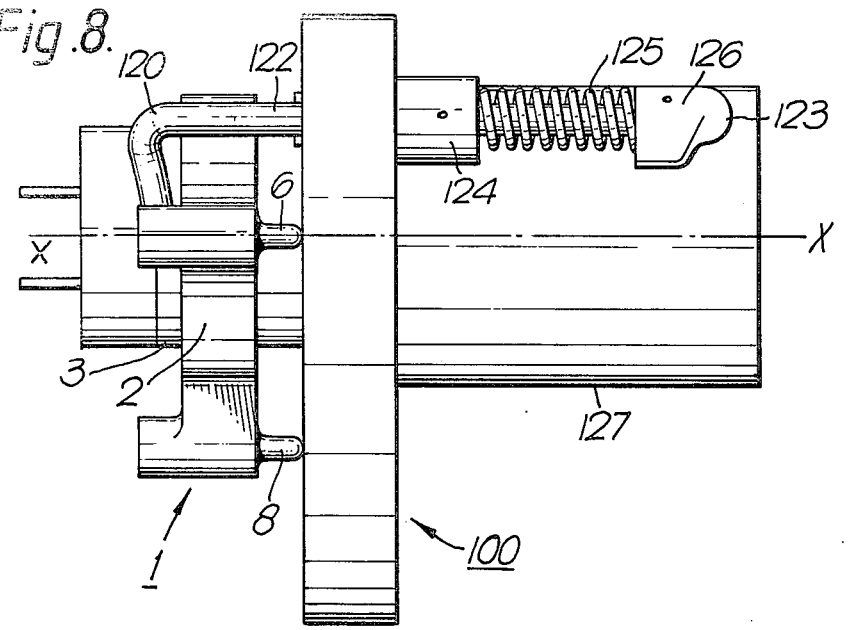
Figure 9:
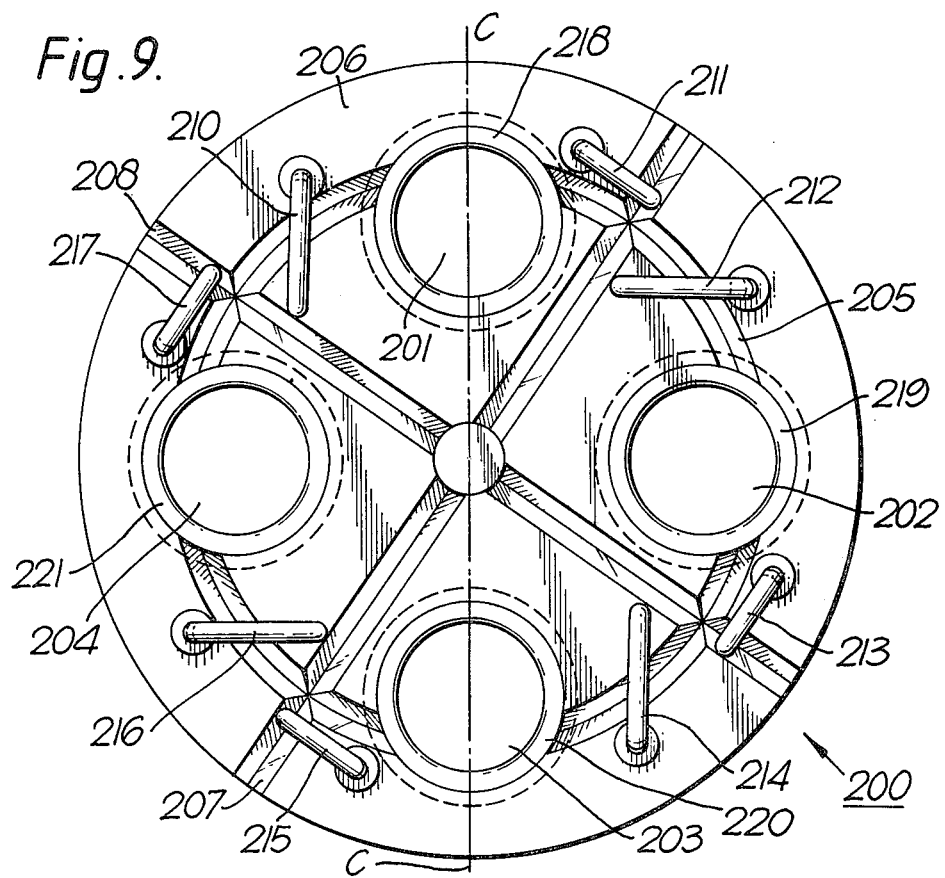
Figure 10:
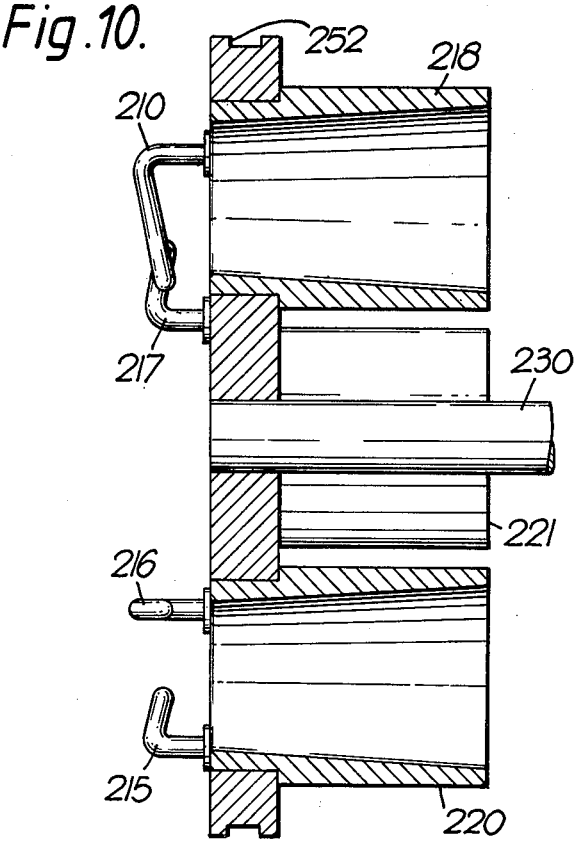
Figure 12:
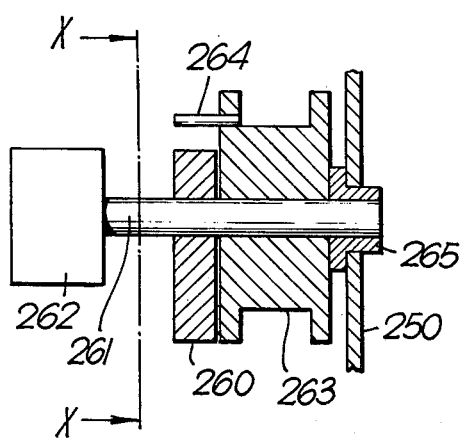
Figure 13:
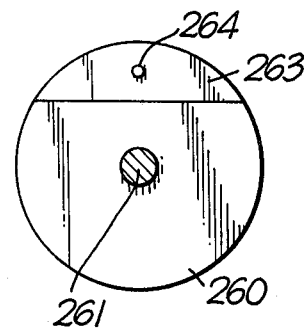
Figure 11:
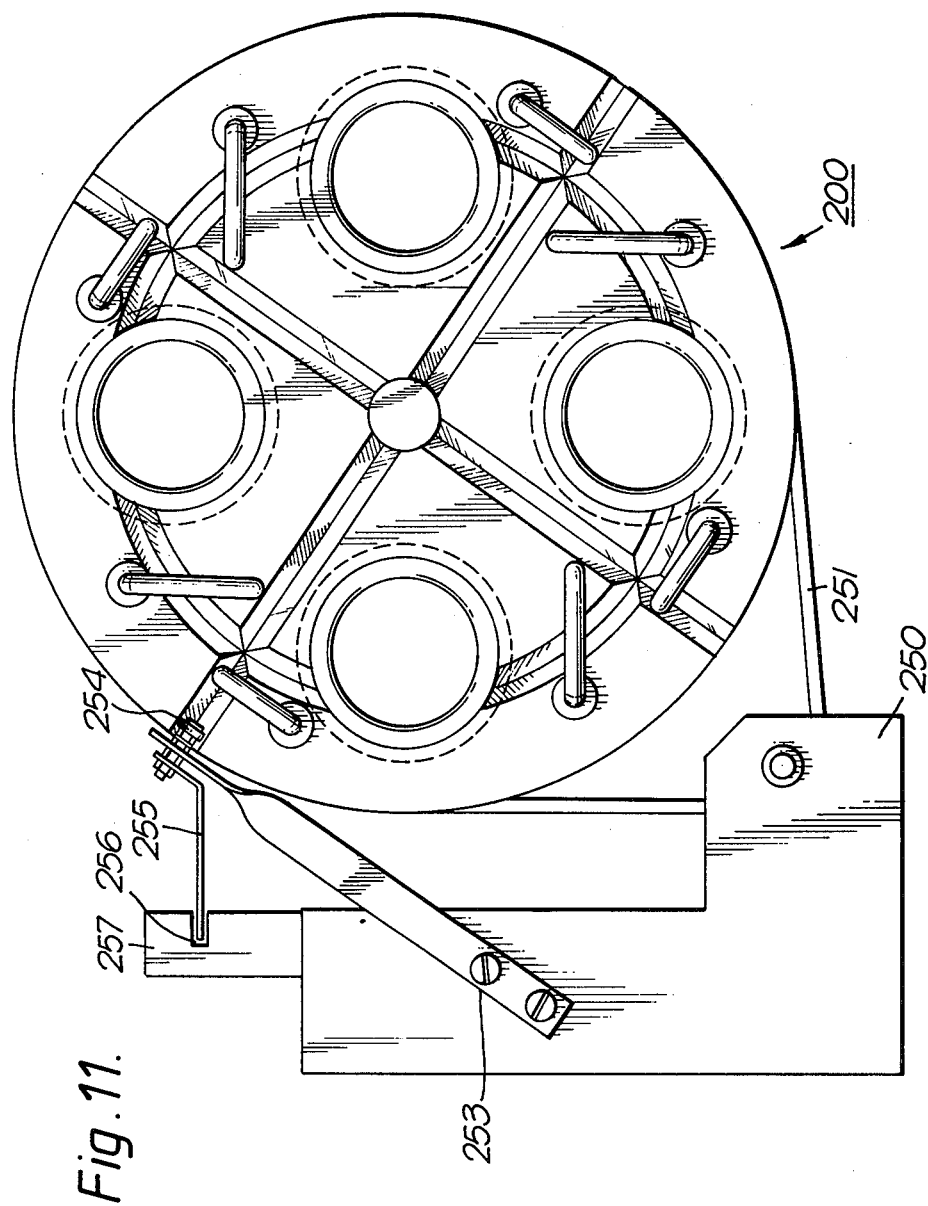

Embodiments of the invention will now be described, by way of example, with reference to the accompanying drawings, in which:

FIG. 1 shows a front elevation of a lamp holder for use in an optical apparatus according to the invention, FIG. 2 is a plan view of the lamp holder shown in FIG. 1, FIG. 3 is a rear elevation of the lamp holder shown in FIG. 1, FIG. 4 is a side elevation of the lamp holder shown in FIG. 1, FIG. 5 is a side elevation of a source lamp fitted in a lamp holder as shown in FIGS. 1 to 4, FIG. 6 is a plan view of a base member for use in an optical apparatus according to the invention, FIG. 7 is a plan view of one embodiment of an optical apparatus according to the invention using the lamp holder shown in FIGS. 1 to 4 and the base member shown in FIG. 6, FIG. 8 is a side elevation of the embodiment shown in FIG. 7, FIG. 9 shows a plan view of a base member in the form of a turntable having four lamp positions, FIG. 10 is a side elevation of the base member shown in FIG. 9, FIG. 11 shows a plan view of the base member of FIG. 9 and additionally shows means for indexing the turntable, FIG. 12 shows a part cross-sectional elevation of a drive arrangement for the turntable, and FIG. 13 shows an elevation looking in the direction X—X of FIG. 12.

FIGS. 1 to 4 show a lamp holder 1 for use in an optical apparatus according to the invention, which lamp holder is in the form of a plastics moulding and comprises a collar portion 2 which is arranged to be clamped round the cylindrical envelope of a source lamp 3, as shown in FIG. 5, by means of a screw 4. The collar portion has a first projection 5 which carries an adjustable ball ended foot 6 at its extremity, the foot 6 extending parallel to the axis of the cylindrical lamp 3 when the holder is clamped to the lamp. The collar 2 is provided with a second projection 7 which carries a second adjustable ball ended foot 8 at its extremity, the foot 8 extending parallel to the axis of the cylindrical lamp 3 when the holder is clamped to the lamp. The collar 2 is further provided with a third projection 9 which carries a ball ended foot 10, the foot 10 extending parallel to the axis of the cylindrical lamp 3 when the holder is clamped to the lamp.

The feet 6 and 8 are made adjustable by forming them on the end of screw threaded cylindrical bodies 11 and 12 which co-operate with threaded holes 13 and 14 in the projections 5 and 7. The foot 10 is not adjustable but is moulded integrally with the projection 9. The feet 6 and 10 are arranged so that a line A—A joining their centres passes through the centre of a substantially circular aperture formed within the collar 2. This line when the holder is assembled on the base member is arranged to intersect the optical axis so that if the holder 1 is rotated about the line joining feet 6 and 10 the light source within the lamp 3 will move in a direction substantially perpendicular to the optical axis. This rotation is caused by adjusting the position of the foot 8. By arranging the feet 6 and 10 to lie on a line which intersects the optical axis and arranging that the radiation source within the lamp lies substantially on that line the focussing error which would be caused by movement of the lamp source along the optical axis is minimised.

The feet 8 and 10 are positioned so that the line B—B joining their centres is perpendicular to the line joining the centre of the feet 6 and 10. Thus adjustment of the foot 8 will cause the optical source within the lamp 3 to move in a direction orthogonal to that caused by adjustment of the foot 6. Consequently the two adjustments do not substantially interact, thus simplifying the adjustment procedure.

The shape and construction of the holder may take many forms it being merely necessary that the holder securely holds the source lamp, is arranged for kinematic connection to the base member, and carries means for adjusting the position of the lamp relative to the kinematic connection points.

FIG. 6 shows a plan view of a base member 100 for co-operation with the source lamp and lamp holder to form an optical apparatus according to the invention. The base member 100 has an aperture 101 through which, in operation, the source lamp 3 projects; an arcuate V-shaped groove 102 which extends on both sides of the aperture 101; and a straight V-shaped groove 103. The centre of the arcuate groove is denoted by the reference numeral 104 and the longitudinal axis of the groove 103 passes through the centre 104.

FIG. 7 shows a plan view of an optical apparatus according to the invention in which the source lamp 3 is clamped in the lamp holder 1 which is in turn assembled on the base member 100. The foot 6 of the holder 1 engages with the groove 102 at the points 110 and 111 (FIG. 6). The foot 8 of the holder 1 engages with the groove 103 at the points 112 and 113 (FIG. 6) and the foot 10 of the holder 1 engages with the groove 102 at the points 114 and 115 (FIG. 6). Since the groove 102 lies on the arc of a circle and the groove 103 lies on a radius of the same circle if the holder 1 is pressed into engagement with the member 100 there will be kinematic connection between the holder 1 and base 100. The advantage of providing kinematic connection between the base and holder is that the accuracy of placement (and re-placement) of the holder on the base is determined solely by the dimensions of the base member and the lamp holder. Therefore, once a lamp and holder have been adjusted on the base member to accurately locate the lamp source on the optical axis the lamp and holder may be removed from the base member and subsequently be replaced on the base member without needing subsequent adjustment to locate the lamp source on the optical axis. This enables a collection of lamps and holders to be kept, each of which is pre-aligned. This may be particularly useful in applications such as atomic absorption spectrophotometry where a number of different analyses using different hollow cathode lamps to provide radiation of different wavelengths may be required to be made in succession. The availability of pre-aligned lamps and holders can substantially speed the analysis since separate adjustments of the lamp position are not required each time a new lamp is selected.

If the base member 100 was placed so that its surface bearing the grooves 102 and 103 was horizontal it would, in theory, be sufficient to place the holder 1 on the base member using gravity to restrain movement of the holder perpendicular to the base member. However such an arrangement would be susceptable to shock or mechanical vibration and additionally it is not generally convenient to provide the optical axis in a vertical direction. Consequently, it is desirable to provide some other means of restraining movement of the holder perpendicular to the base member. As shown in FIGS. 7 and 8 in this embodiment the restraining force is provided by two similar spring loaded clamping members 120 and 121. The clamping member 120, which can be seen more clearly in FIG. 8, comprises a rod 122 which is bent to form a substantially L-shaped member one limb of which passes through the base member 100 and terminates in a knob 123. The rod 122 passes through a housing 124 which is fixed to the base member 100 and is surrounded over its length between the housing 124 and knob 123 by a helical spring 125. The spring tangs engage within the housing 124 and the knob 123 and the knob 123 is rotated through approximately 90° to align a hole 126 in the knob with a corresponding hole in the rod 122 to allow a pin to be inserted to retain the knob on the rod. The rotation of the knob 'winds up' the spring and consequently when the spring is compressed it will cause the rod 122 to rotate, thus automatically causing the other limb of the L to rotate over the projections 5 and 7 on the holder 1. The base member 100 also carries a lamp shield 127 which is made of a thermoplastics material is provided primarily to guide the lamp into the aperture and to reduce the possibility of breaking the glass envelope of the lamp when inserting it into the aperture.

To align the lamp 3 and lamp holder 1 so that the radiation source within the lamp lies on the optical axis, represented by the line X—X in FIG. 8 the foot 8 is adjusted by screwing the threaded body portion 12 in the threaded hole 14. Thus rotating the holder 1 about the line joining the centres of the feet 6 and 10 and consequently moving the radiation source vertically, assuming the apparatus is orientated as shown in FIG. 8. To adjust the position of the radiation source in a direction perpendicular to the plane of FIG. 8 the foot 6 is adjusted by screwing the body portion 11 in the threaded hole 13 thus rotating the holder 1 about the line joining the centres of the feet 8 and 10 and consequently moving the radiation source horizontally in a direction substantially perpendicular to the optical axis X—X.

Thus the combination of the lamp and lamp holder as shown in FIGS. 1 to 5 with the base member shown in FIG. 6 enables the construction of an optical apparatus as shown in FIGS. 7 and 8 in which the lamp and lamp holder may be easily adjusted to align the radiation source with the optical axis by the simple adjustment of two screw threaded feet which adjustments are substantially indpendent of one another and in which the lamp holder may be removed from and later replaced on the base member without requiring further alignment.

The clamping means 120 and 121 provide a simple means of holding the holder 1 in contact with the base member 100 and has the advantage that when the springs are compressed the rods rotate to automatically ride over the projections 5 and 9 on the holder 1.

FIG. 9 shows a plan view of a base member 200 in the form of a turntable while FIG. 10 is a cross-sectional elevation on line C—C of FIG. 9. The turntable 200 forms the basis of a lamp turret which enables one of the selected number of lamps to be selected at will. By mounting the lamps in a turret it can be arranged that all the lamps are continuously powered so that no 'warm up' time is required when the turret is rotated to change the operative lamp. The turntable 200 is provided with four apertures 201–204 through which source lamps project when assembled onto the base member 200. A circular V-shaped groove 205 is machined in the surface 206 of the turntable on which the lamp holder 1 is mounted, the groove 205 being centred on the centre of rotation of the turntable. Two straight V-shaped grooves 207 and 208 are machined into the surface of the turntable, these grooves extending diametrically through the centre of rotation of the turntable and being perpendicular to each other. Each spring loaded clamps 210–217 are provided, two for each lamp position to clamp the lamp holders to the turntable. The spring loaded clamps are as described with reference to FIG. 8. Lamps shields 218, 219, 220 and 221 are provided at each aperture.

The turntable shown in FIGS. 9 and 10 is capable of carrying four lamps with individual lamp holders. Each lamp holder has its foot 8 located in the appropriate diametrically extending groove and its feet 6 and 10 in the circular groove 205 on either side of the corresponding aperture and is clamped to the turntable by the appropriate clamping members. The lamp 3 will extend into the appropriate lamp shield which is particularly useful when a number of lamps are mounted together. The shield which is made of a thermoplastics material is provided primarily to guide the lamp into the aperture and to reduce the possibility of breaking the glass envelope of the lamp when inserting it into the aperture.

The turntable 200 rotates on a shaft 230 and may be rotated by any convenient means to bring a selected one of the lamp positioning into registration with the optical axis. To maintain accuracy of positioning of the lamps at each location on the turntable with respect to the optical axis the grooves 207 and 208 are extended to the circumference of the turntable. When the turntable reaches a desired position a spring loaded roller engages with the appropriate groove to accurately locate the relevant aperture with respect to the roller and hence the frame on which the turntable is mounted. Since each lamp holder is located by the same groove that is engaged by the spring loaded roller the lamp holders can be adjusted in one location on the turntable and used in a different location on the turntable. Thus it is not necessary to note at which location the lamp holder was adjusted when a lamp holder is removed. The accuracy of replacement will depend on the circular groove being accurately co-axial with the centre of rotation of the turntable but this is not beyond normal tolerances of machining. To ensure an accurately co-axial groove the groove may be milled on the machine used to bore the central hole for the shaft.

FIG. 11 shows a drive mechanism for the turntable 200. An electric motor is mounted on a frame 250 and drives the turntable 200 via a pulley and a belt 251 which engages in a peripheral groove 252 in the turntable (FIG. 10). The frame 250 also carries a spring arm 253 to the free end of which a roller 254 is connected. The roller 254 rides on the surface of the turntable 200 until, as the turntable is rotated, it drops into one of the V-grooves 207 and 208. The spring arm 253 carries a second arm 255 which when the roller drops into the V groove enters a slot 256 in a housing 257. The housing 257 has mounted on each side of the slit 256 a light source and a photodetector which together form a switch which is operated by the movement of the second arm 255 into or out of the slot. The switch is used to control the motor driving the belt 251 and hence the turntable 200.

Since there will be a time delay between the roller dropping into the groove, the switch operating and the drive motor stopping a lost motion drive may be introduced to prevent the roller being biassed against one side of the V of the groove and giving rise to possible inaccuracy of setting of the turntable. A suitable lost motion drive is shown in FIGS. 12 and 13 and comprises a D shaped member 260 which is keyed to the shaft 261 of a motor 262. A pulley 263 is loosely coupled to the shaft 261 and carries a peg 264. The shaft 261 has its free end mounted in a bearing 265 on the frame 250.

When the motor 262 turns the shaft 261 the D shaped member 260 rotates until its flat face 266 engages the peg 264 on the pulley 263 when it then continues to rotate the causes the pulley to rotate thus driving the turntable. When the switch is operated the motor stops and then reverses for a short period to disengage the peg 264 from the flat face of the D shaped member 260. Thus the roller 254 will centre itself in the V groove.

It would be possible to use alternative driving means for the turntable and to use alternative lost motion drives. The embodiment shown is merely one example of a method of achieving the requirement of accurately indexing the turntable from one position to the next.

It would be possible to form the turntable with a different number of lamp positions e.g. three or six, in which case a corresponding number of radial grooves would be machined. These grooves would normally be uniformly spaced around the turntable as this would enable a smaller diameter turntable to be used when accommodating a lamp and lamp holder of a given size. However if the positions were unevenly spaced around the turntable the radial grooves would have the same uneven spacing.

I claim:

1. An optical apparatus comprising a base member, an optical source lamp, a lamp holder, and means for urging the holder against the base member, characterised in that the holder has a three point kinematic contact with the base member and is provided with means for adjusting position of the lamp with respect to the base member to direct radiation along a preselected optical axis.

2. An optical apparatus as claimed in claim 1 in which the holder has three ball ended feet which engage in V shaped grooves in the base member.

3. An optical apparatus as claimed in claim 2 in which the holder comprises a collar which is arranged to be clamped round the envelope of the lamp.

4. An optical apparatus as claimed in claim 3, in which the collar is formed with three projections which extend perpendicular to the optical axis, the three contact points on the holder being formed on the projections.

5. An optical apparatus as claimed in claim 2, in which the means for adjusting the position of the lamp comprises means for extending or retracting at least two of the feet in a direction parallel to the optical axis.

6. An optical apparatus as claimed in claim 5, in which at least two of the feet have screw threaded portions which co-operate with screw threads in apertures in the projections.

7. An optical apparatus as claimed in claim 6, in which the means for urging the holder against the base member comprises two spring loaded L-shaped members which engage over two of the projections on the collar.

8. An optical apparatus as claimed in claim 7, in which each spring loaded member is formed by a rod surrounded by a helical spring, the spring being assembled on the rod and base member so that the rod is caused to be rotated when the spring is compressed.

9. An optical apparatus as claimed in claim 1 in which the base member comprises a turntable having a plurality of locations at which a corresponding number of lamp holders may be positioned and means for rotating the turntable so that a desired location may be brought into register with the optical axis.

10. An optical apparatus as claimed in claim 9, in which the turntable is provided with a circular V-shaped groove which is co-axial with the rotational axis of the turntable and a plurality of radial V-shaped grooves corresponding to the plurality of locations and in which each lamp holder has three ball ended feet two of which engage with the circular groove and the other of which engages with the appropriate radial groove.

11. An optical apparatus as claimed in claim 10, in which the radial grooves extend to the periphery of the turntable and the means for rotating the turntable includes a spring loaded roller which is biassed into the appropriate radial groove to bring the desired location into register with the optical axis.

12. An optical apparatus as claimed in claim 11, in which the spring loaded roller mechanism operates a switch when the roller enters the groove.

13. An optical apparatus as claimed in claim 12, in which the turntable is driven by means of a belt and pulley arrangement, the belt engaging with the periphery of the turntable, wherein a lost motion arrangement is incorporated between a drive motor and the pulley.

14. An optical apparatus as claimed in claim 13, in which when the switch is operated the direction of the motor is reversed for a predetermined period.

15. An optical arrangement as claimed in claim 14, in which the lost motion arrangement comprises a peg which engages with the flat of a D shaped member, one of the peg and D shaped member being coupled to the motor and the other to the pulley.

16. An optical apparatus as claimed in claim 1 in which the holder comprises a collar which is arranged to be clamped around the envelope of the lamp.

17. An optical apparatus as claimed in claim 4, in which the means for urging the holder against the base member comprises two spring loaded L-shaped members which engage over two of the projections on the collar.

18. An optical apparatus as claimed in claim 17, in which each spring loaded member is formed by a rod surrounded by a helical spring, the spring being assembled on the rod and base member so that the rod is caused to be rotated when the spring is compressed.

* * * * *